(12) United States Patent
Faraj (10) Patent No.: US 7,785,515 B2
(45) Date of Patent: Aug. 31, 2010

(54) HEAT APPLIED MELTED-ON FACETED BEADS

(76) Inventor: Zaher Faraj, 422 Cliff St., Ridgefield, NJ (US) 07022

( * ) Notice: Subject to any disclaimer, the term of this patent is extended or adjusted under 35 U.S.C. 154(b) by 870 days.

(21) Appl. No.: 11/308,087

(22) Filed: Mar. 6, 2006

(65) Prior Publication Data

US 2006/0151101 A1    Jul. 13, 2006

Related U.S. Application Data

(63) Continuation of application No. 10/248,420, filed on Jan. 17, 2003, now abandoned.

(51) Int. Cl.
*B29C 65/02* (2006.01)
*A44C 27/00* (2006.01)

(52) U.S. Cl. ............... 264/257; 63/37; 264/273

(58) Field of Classification Search ........... 228/180.22, 228/228; 156/91, 277; 264/257, 320, 324, 264/273; 63/37
See application file for complete search history.

(56) References Cited

U.S. PATENT DOCUMENTS

| | | | |
|---|---|---|---|
| 2,397,743 A * | 4/1946 | Kaphan | 428/195.1 |
| 3,772,160 A * | 11/1973 | Arndt | 205/75 |
| 3,887,903 A * | 6/1975 | Martell | 700/132 |
| 4,871,110 A * | 10/1989 | Fukasawa et al. | 228/245 |
| 5,167,743 A | 12/1992 | Chalfin | |
| 5,284,287 A * | 2/1994 | Wilson et al. | 228/180.22 |
| 5,762,259 A * | 6/1998 | Hubacher et al. | 228/180.22 |
| 5,816,482 A * | 10/1998 | Grabbe | 228/212 |
| 5,865,397 A * | 2/1999 | Herrmann | 244/14 |
| 6,013,899 A * | 1/2000 | Eguchi et al. | 219/388 |
| 6,057,922 A * | 5/2000 | Hayden | 356/457 |
| 6,230,963 B1* | 5/2001 | Hertz | 228/246 |
| 6,533,159 B1* | 3/2003 | Cobbley et al. | 228/20.1 |
| 6,805,274 B2* | 10/2004 | Inoue | 228/39 |
| 2003/0057609 A1 | 3/2003 | Ratcliffe | |
| 2004/0069396 A1 | 4/2004 | Trosman et al. | |
| 2004/0086318 A1 | 5/2004 | Geddes | |

* cited by examiner

*Primary Examiner*—Matthew J. Daniels
(74) *Attorney, Agent, or Firm*—Furr Law Firm; Jeffrey M. Furr (57) ABSTRACT

This invention is a method to attach beads to garments. The process is as follows: draw the art work, digitize the drawing and write it in a Laser cutting machine language, using a high heat resistance material, cut the material to the same shape as artwork, glue fabric on the back of screen to prevent beads from falling through, dip the screen in a container of beads in which the beads would fill up the holes and stay only where the cut holes are and where the beads extend beyond material. Laying the fabric on top of the pattern that have the beads and apply top heat with a lot of pressure, so the plastic bead portion that is sticking out of the screen melts into the fabric and bonds to it in seconds creating a beautiful beaded design that would have taken hours and days to make using the traditional sewn-on beading methods.

10 Claims, 10 Drawing Sheets

FIG. 10 ical and economically feasible. There is still room for
improvement in the art.

HEAT APPLIED MELTED-ON FACETED BEADS

RELATED APPLICATIONS

This application is a Continuation of application Ser. No. 10/248,420 filed on Jan. 17, 2003.

BACKGROUND OF INVENTION

This invention relates generally to the applying of beads to fabric and more particularly bead designs.

1. Background

Beads have been attached at garments for thousands of years by sewing the beads on fabric by hand. This has always been a time consuming process taking hours and days of manual labor to attach the beads in the simplest of designs.

2. Description of Prior Art

Garments designs with beads has been around for many, many years. The beads are used to form designs or to essentiate parts of the garments. The biggest use of beads is in that of making dresses and women's accessories.

Endless designs can be made with any color beads and all can be combined with other type of embellishments such as embroidery, screen printing and many more. With new beading technique any design is possible such as Floral, Geometric, Letters and much more. The plastic beads need to be applied to fabric in this manner where any shape or pattern can be made with precision and consistency In the past, to get this look, there were only the imported glass and plastic beads that were sewn on by hand in India, China, Haiti, Philippine and other countries where labor is very cheap.

For the foregoing reasons, there is a need for a method to attached beads to garments that is fast, easy, precise, consistent and economically feasible. There is still room for improvement in the art.

SUMMARY OF INVENTION

The present invention relates to a method to put plastic beads on a garment.

Accordingly, it is an object of the present invention to place plastic beads on a garment in a fast, easy, precise, consistent and economically feasible method. The process is as follows:

1) draw the art work;
2) Digitize or copy the drawing and write it in a Laser cutting machine language.
3) Use a thick high heat resistance material such as 3 mm Gasket material;
4) Cut the material on the Laser machine so that it is in the same shape as artwork;
5) Attach fabric on the back of screen to prevent beads from falling through;
6) Dip the screen in a container of 4 mm beads so that the beads fill up the holes and stay only where the cut holes are and they so would stick out from the screen by 1 mm;
7) Lay the fabric that you need to put beads on, on top of the pattern that have the beads;
8) Apply 375 degree of top heat with a lot of pressure, so the part of the plastic bead that is sticking out of the screen melts into the fabric and bonds to it.

Using this method, endless designs can be made this way with any color beads and all can be combined with other type of embellishments such as embroidery, screen printing and many more.

Any design is possible including Floral, Geometric, Letters and much more. The uniqueness of this technique is that this is the first time that plastic beads are applied to fabric in this manner where any shape or pattern can be made with precision and consistency.

BRIEF DESCRIPTION OF DRAWINGS

Without restricting the full scope of this invention, the preferred form of this invention is illustrated in the following drawings.

DETAILED DESCRIPTION

The following description of a method to attached beads to garments is demonstrative in nature and is not intended to limit the scope of the invention or its application of uses.

Figure 1:
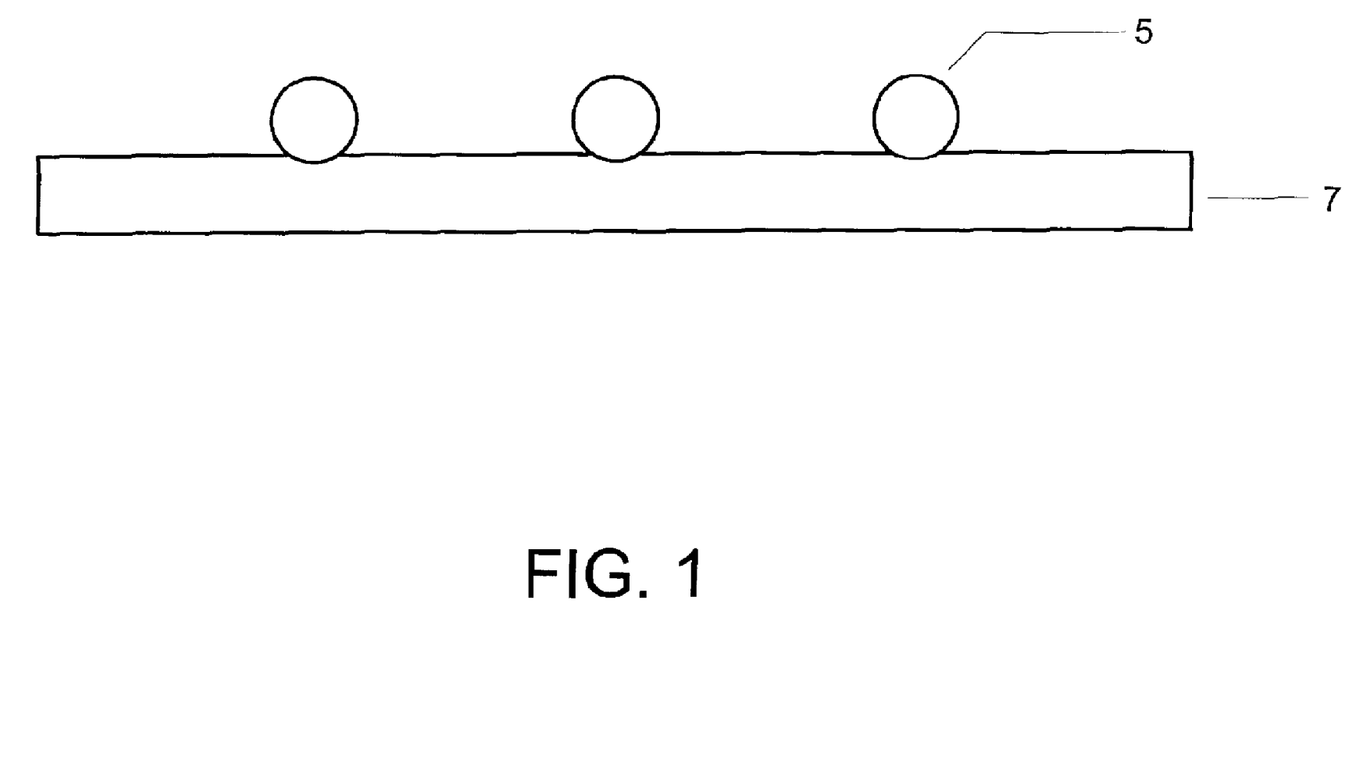
FIG. 1 show the bead attached to fabric.

FIG. 1 shows a close up view of beads 5 being attached to garment 7. It shows how the plastic beads are bonded to fabric. This is the goal of the current invention to do this where any shape or pattern can be made with precision and consistency.

In the preferred embodiment, plastic beads would be used, but any material can be used so long as it bonds to the garment 7 under proper heat and pressure that is safe for the garment 7. Multiple colors, shapes and/or textures of beads can be used for this invention or well as different types of garments 7.

Figure 2:
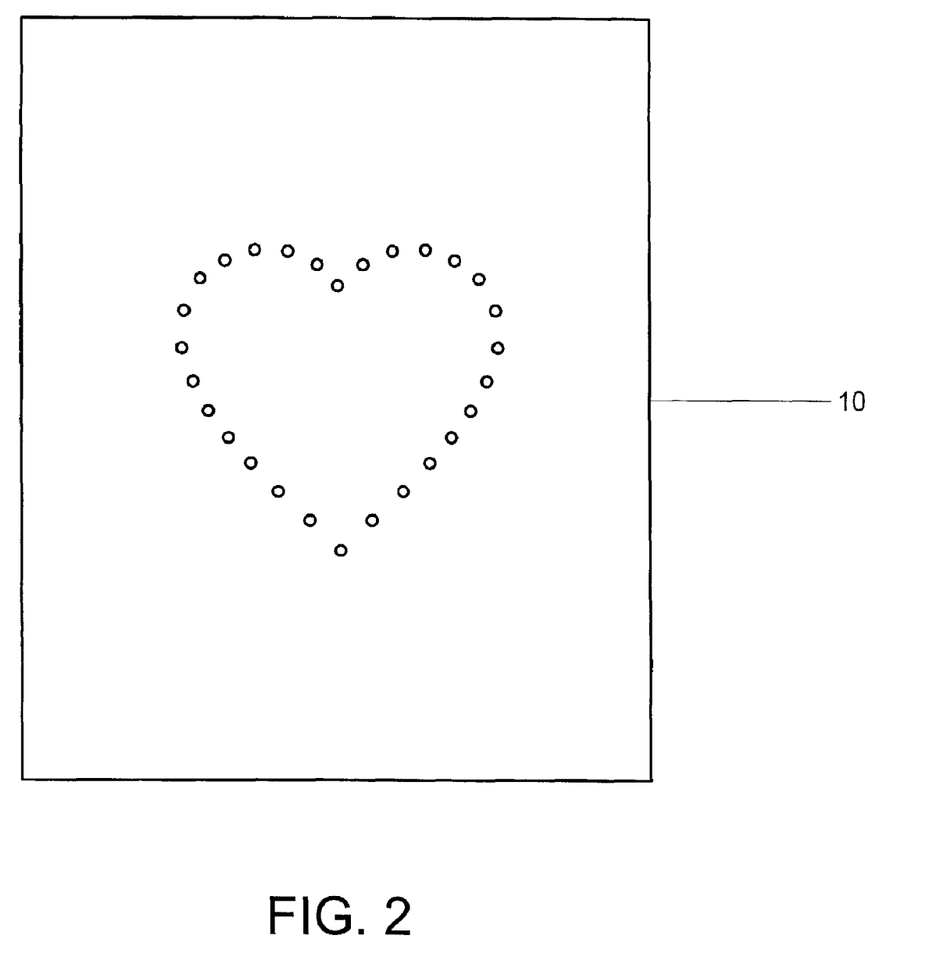
FIG. 2 shows the artwork to be used.
Figure 3:
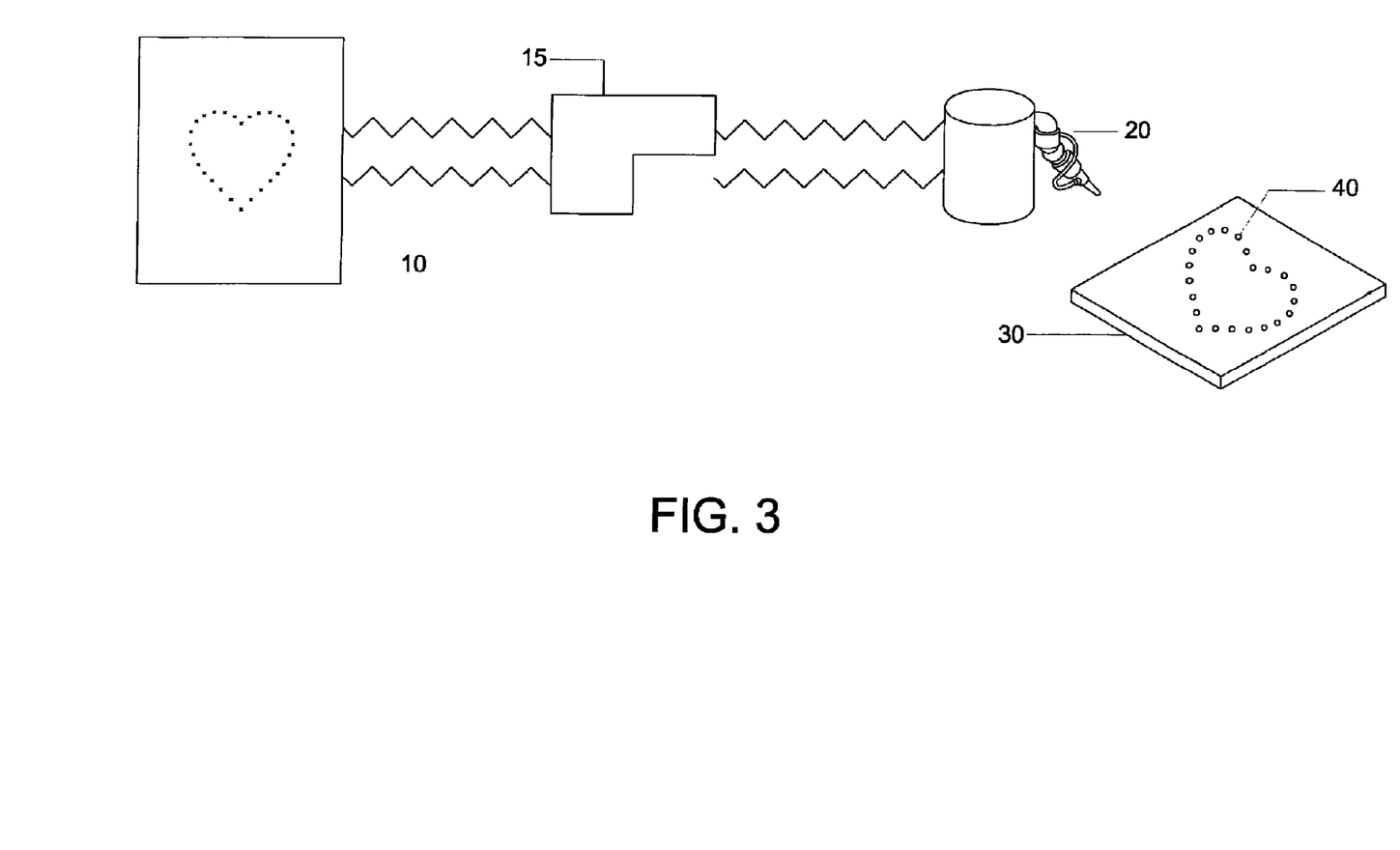
FIG. 3 shows the process digitizing the artwork and writing it in cutting language.

FIG. 2 shows a sample pattern or artwork 10 that can be used with this process. FIG. 3 displays the first step of the process, if the user does not have a previous artwork or design to use the users draws the artwork/design 10 to be used in the process.

Figure 4:
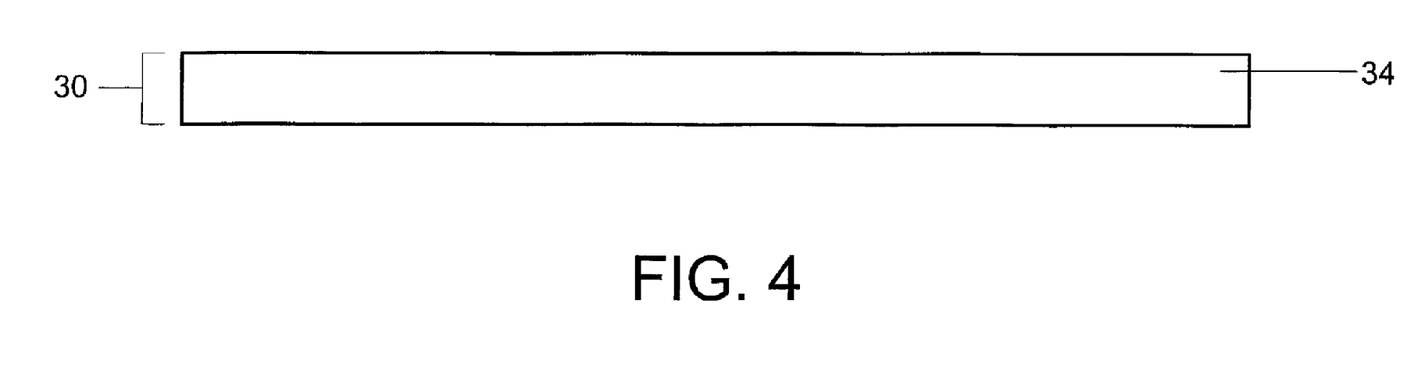
FIG. 4 shows the material.
Figure 5:
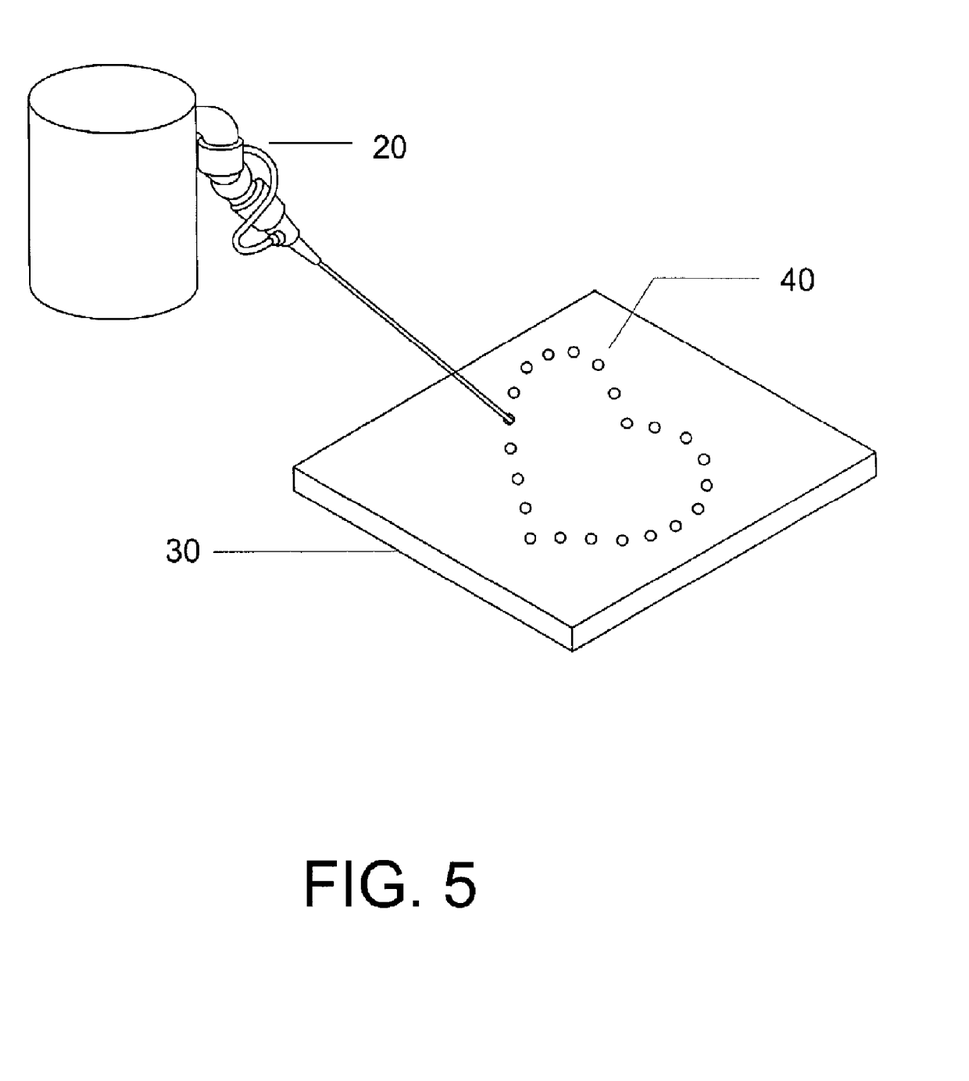
FIG. 5 shows the material being cut.

In the preferred embodiment, the artwork/design 10 is digitized and using software that is standard in the industry, it is written in a Laser cutting machine language 15 to be used by a laser cutting machine 20. FIG. 4 displays the material 30 that the pattern 40 is cut into. FIG. 4 displays the material before it is cut. In the preferred embodiment, the material is a 3 mm thick high heat resistance material such as Gasket material Karropaak. The material 30 is such that substance that can be removed. The material 30 is of such dimensions that the whole pattern 40 can be placed in it FIG. 5 shows the laser machine removing the fill layer 34 from the material 30 to form the pattern 40 which will match the artwork 10.

Figure 6:
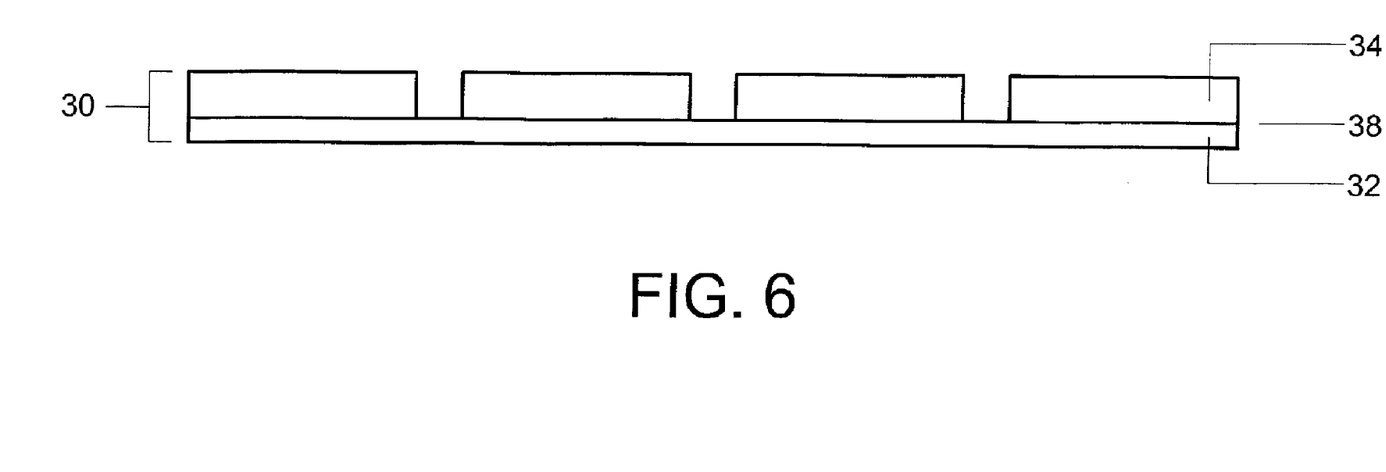
FIG. 6 shows the backing being glued on the back of material.

FIG. 6 also is a cross section of the material 30 showing the fill layer 34 removed to form the pattern 40. The removed fill layer 34 forms a well 36. FIG. 6 also shows a screen layer 32 being applied to one side of the material 30 forming a design screen 50. The screen layer 32 is made up of by attaching a plastic netting, fabric, cloth or similar material to one side of the removed fill layer 34 blocking one side of the well (s) 36. The screen layer 32 prevents the beads 5 from falling through the well 36. In the preferred embodiment, the screen layer 32 is glued onto the material 30 using an industry standard epoxy or glue. The design screen 50 consists of a screen layer 32 which is glued with epoxy layer 38 to the removable fill layer 34.

Figure 7:
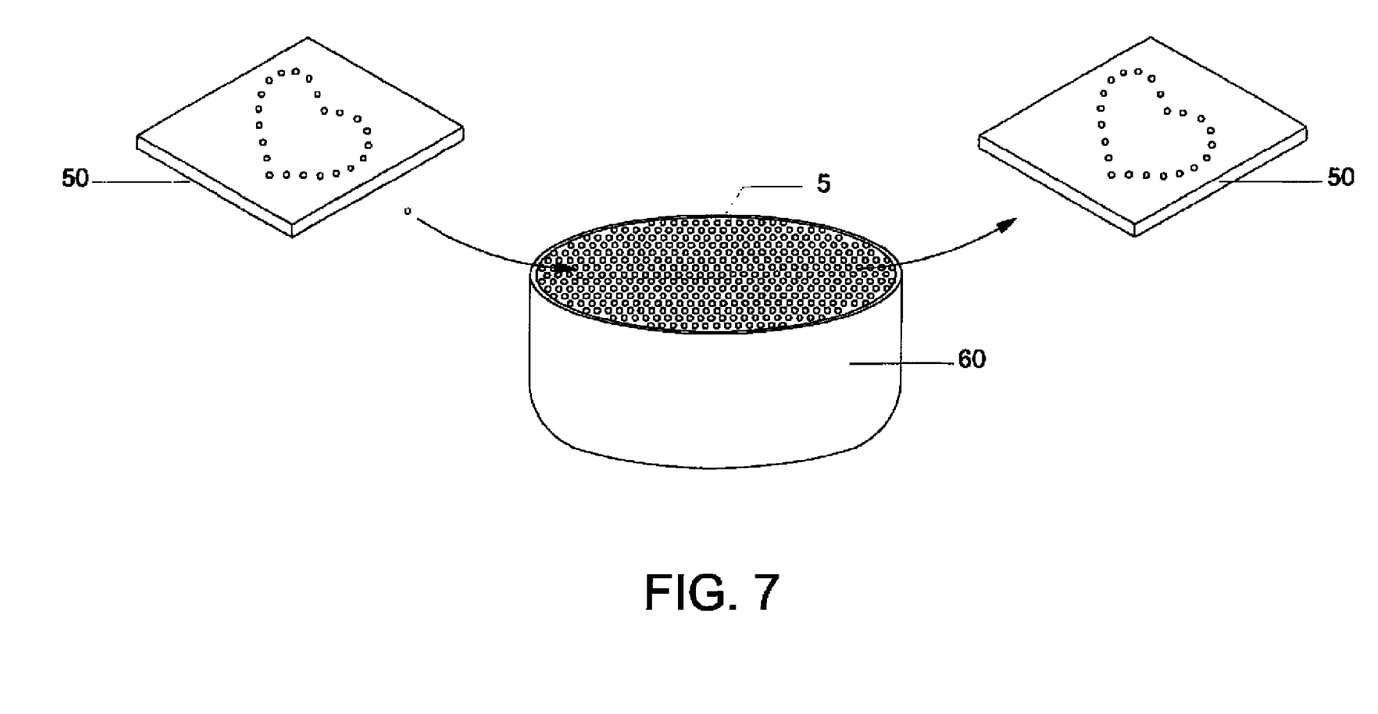
FIG. 7 shows dipping the screen in a container of beads.
Figure 8:
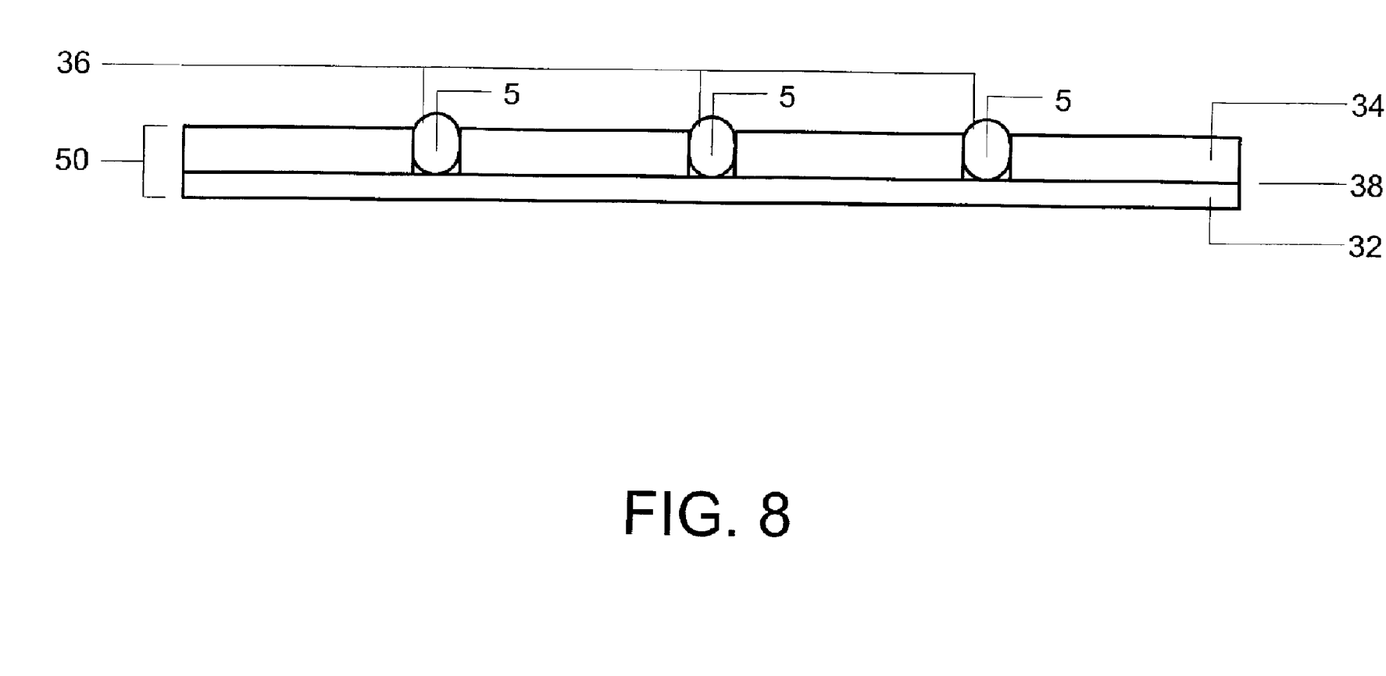
FIG. 8 shows the beads within the wells.

FIG. 7 shows the design screen 50 being dipped into a container 60 of beads 5. The beads 5 fill up the wells 36 of the pattern 40. In the preferred embodiment, the design screen in 3 mm thick and the beads are 4 mm think. This leaves 1 mm of the beads extending out beyond the design screen 50 as shown in FIG. 8.

Figure 9:
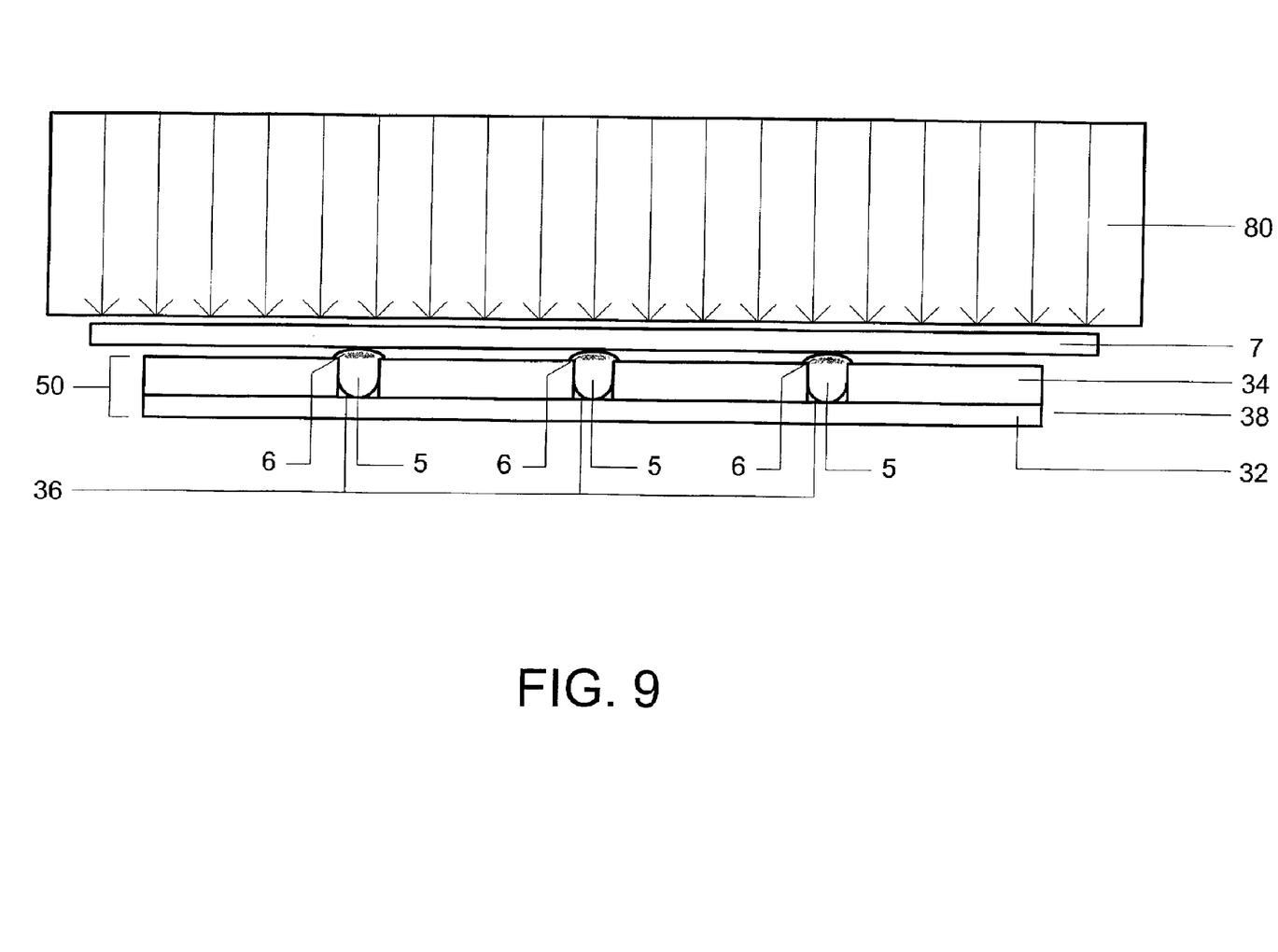
FIG. 9 shows the laying of the fabric on top of the pattern and applying heat and pressure.

FIG. 9 shows the garment 7 being placed on the design screen 50 that has had the well 36 filled with beads 5. Heat and pressure 80, 375 degrees of top heat in the preferred embodiment, is applied to the garment 7 that is on the design screen 50. This will melt the portion of the bead 5 that extends beyond the design screen 50 bonding it to the garment 7 by a bond 6.

Multiple design screens 50 can be used with the same garment 7 allowing for multi-color patterns. Each design screen 50 being dipped into its appropriate container 60 of bead 5.

Figure 10:
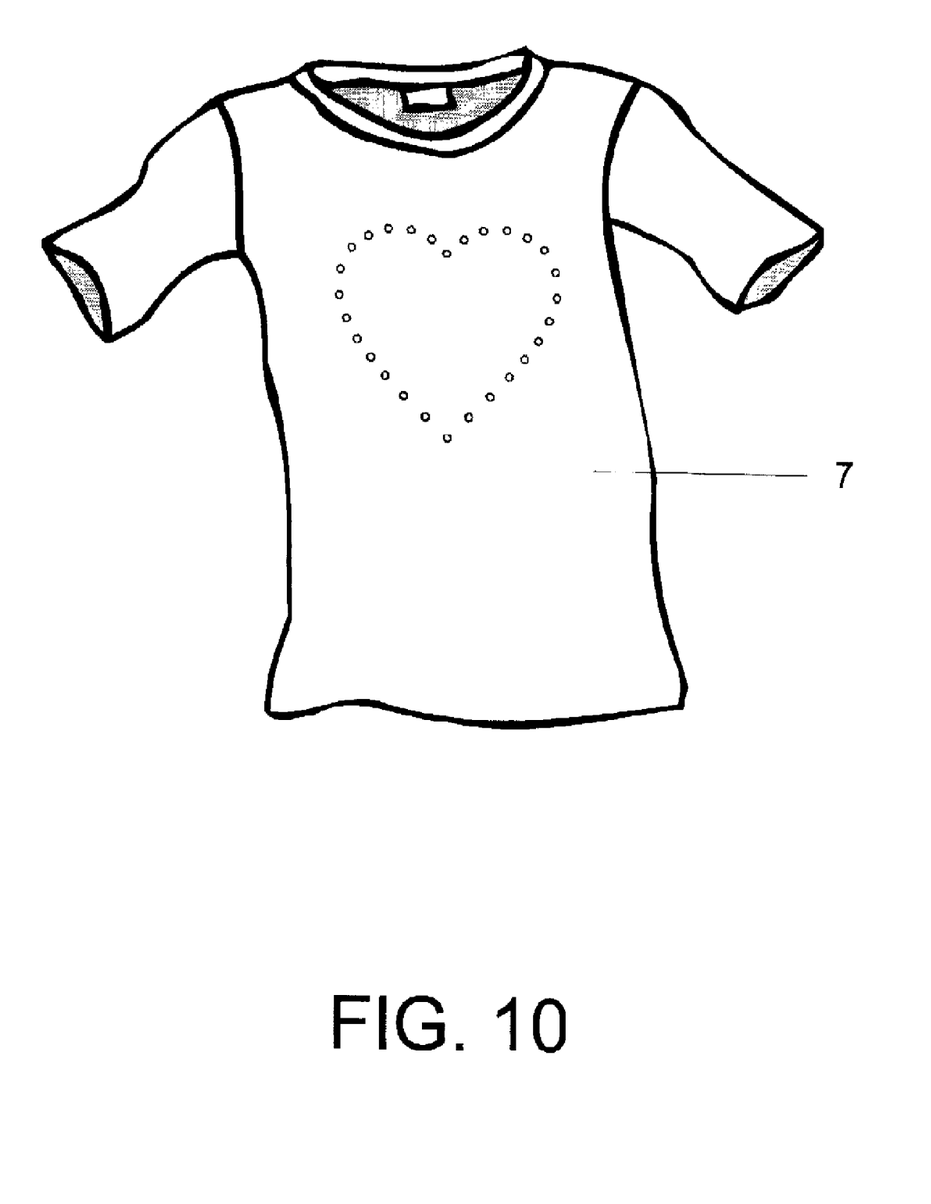
FIG. 10 shows the fabric with the beads attached.

FIG. 10 displays the garment 7 with the bead pattern attached. Although many features, functions, and advantages of the present invention have been described in this specification, together with details of the structure of specific embodiments thereof, the description as a whole is illustrative only, and substitutions may be made in detail, especially in matters of shape, dimension and arrangement of elements within the principles of the invention to the full extent indicated by the broad, general meaning of the terms in which the claims are expressed.

Alternative Embodiment

In an alternative embodiment, as shown in FIG. 3, the design/artwork 10 can be done using CAD/Design software on a workstation 15. This design 10 can then be written out in a Laser machine language for the Laser machine 20 to use.

In an other embodiment, the removable fill layer 34 can be removed using other means such as a drill or bore.

ADVANTAGES

The previously described version of the present invention has many advantages, including many elements missing in all prior art. It provides a method of applying plastic beads to fabric where any shape or pattern can be made with speed, precision and consistency. Although many features, functions, and advantages of the present invention have been described in this specification, together with details of the structure of specific embodiments thereof, the description as a whole is illustrative only, and substitutions may be made in detail, especially in matters of shape, dimension and arrangement of elements within the principles of the invention to the full extent indicated by the broad, general meaning of the terms in which the claims are expressed. Therefore, the point and scope of the appended claims should not be limited to the description of the preferred versions contained herein.

What is claimed is:

1. A method for attaching thermoplastic beads comprising: using CAD/Design software to form a pattern, using a laser cutting machine to cut said pattern from a high heat resistance material forming wells with said material forming a screen, attaching a screen layer to one side of said screen, dipping the screen in a container of thermoplastic beads with the screen positioned so said thermoplastic beads till said wells; laying fabric on the top of said screen; and applying heat and pressure to the fabric towards said screen forming a bond between said thermoplastic beads and said fabric by the melting of said beads into said fabric.

2. A method as in claim 1 where in the step using CAD/Design software to form a pattern includes the steps of drawing artwork, digitizing said artwork and using said artwork to form a pattern.

3. A method as in claim 1 where in said material is a gasket material.

4. A method as in claim 1 where in the step using CAD/Design software to form a pattern includes the steps of using digitally stored data to form a pattern.

5. A method as in claim 1 where in said heat is between the temperatures of 375 degrees Fahrenheit and 400 degrees Fahrenheit.

6. A method for attaching thermoplastic beads comprising: the step of using CAD/Design software to form a pattern by drawing artwork, digitizing said artwork and using said artwork to form a pattern, using a laser cutting machine to cut said pattern by removing material from a high heat resistance material forming wells with said material forming a screen, attaching a screen layer to one side of said screen, dipping the screen in a container of thermoplastic beads with the screen positioned so said thermoplastic beads fill said wells; laying fabric on the top of said screen; and applying heat and pressure to the fabric towards said screen forming a bond between said thermoplastic beads and said fabric by the melting of said thermoplastic beads into said fabric.

7. A method as in claim 6 where in said material is a gasket material.

8. A method for attaching thermoplastic beads comprising: using artwork to form a pattern, using a laser cutting machine to remove material from a high heat resistance material forming wells that form said pattern with said material forming a screen; attaching a screen layer to said screen; dipping the screen in a container of thermoplastic beads with the screen positioned so said thermoplastic beads fill said wells where said beads extend beyond said wells; laying fabric on the top of said screen; and applying heat and pressure to the fabric towards said screen forming a bond between said thermoplastic beads and said fabric by the melting of said thermoplastic beads into said fabric including said steps of drawing artwork, digitizing said artwork and using said artwork for said pattern.

9. A method as in claim 8 where in said material is a gasket material.

10. A method as in claim 8 where in said heat is between the temperatures of 325 degrees Fahrenheit and 400 degrees Fahrenheit.

* * * * *